(12) United States Patent
Yu

(10) Patent No.: US 6,984,136 B2
(45) Date of Patent: Jan. 10, 2006

(54) ELECTROMAGNETIC-INTERFERENCE PREVENTION MECHANISM FOR ELECTRONIC PRODUCTS

(75) Inventor: Chih-Chin Yu, Tao-Yuan Xian (TW)

(73) Assignee: Inventec Corporation, Taipei (TW)

( * ) Notice: Subject to any disclaimer, the term of this patent is extended or adjusted under 35 U.S.C. 154(b) by 257 days.

(21) Appl. No.: 10/385,917

(22) Filed: Mar. 11, 2003

(65) Prior Publication Data

US 2004/0090762 A1    May 13, 2004

(30) Foreign Application Priority Data

Oct. 16, 2002    (TW)    .............................. 91216451 U

(51) Int. Cl.
*H05K 7/14*    (2006.01)

(52) U.S. Cl. ........................ 439/92; 361/799; 439/341
(58) Field of Classification Search ................ 439/341, 439/188, 92, 700, 376; 361/799, 818, 683, 361/686

See application file for complete search history.

(56) References Cited

U.S. PATENT DOCUMENTS

| 4,969,830 | A | * | 11/1990 | Daly et al. | ................... | 439/136 |
| 5,557,562 | A | * | 9/1996 | Yoshiharu et al. | .......... | 361/686 |
| 6,119,184 | A | * | 9/2000 | Takahama | ................... | 710/303 |
| 6,195,265 | B1 | * | 2/2001 | Choi | .......................... | 361/799 |
| 6,817,588 | B2 | * | 11/2004 | Tsai | ........................... | 248/562 |

* cited by examiner

*Primary Examiner*—Neil Abrams
(74) *Attorney, Agent, or Firm*—Fulbright & Jaworski LLP

(57) ABSTRACT

An electromagnetic-interference (EMI) prevention mechanism includes an expansion unit or base (1) having conductive hooks (20) and conductive spring biased pins (10). An electronic product (4) to be placed onto the expansion unit includes conductive connection holes (41) and conductive areas on its bottom surface. The connection holes are to be joined to the hooks and the conductive areas are to be pressed against the pins (10) whereby the product conductive holes and the conductive areas become joined electrically to the expansion unit and electromagnetic waves generated by the product are guided to the expansion unit.

11 Claims, 3 Drawing Sheets

ELECTROMAGNETIC-INTERFERENCE PREVENTION MECHANISM FOR ELECTRONIC PRODUCTS

FIELD OF THE INVENTION

The present invention is generally related to an electromagnetic-interference (EMI) prevention mechanism for electronic products, and more particularly, to an EMI prevention mechanism that includes electrically conducting contact pins and hooking members to achieve the purpose of preventing EMI.

BACKGROUND OF THE INVENTION

A variety of currently popular electronic products, such as notebook computer and personal digital assistant (PDA), are constantly developed to have a small and compact volume for users to carry them in a more convenient manner. To minimize the weight and volume of these electronic products, some conventional built-in access means, such as disk drive, hard disk, CD-ROM, etc., are now externally connected to the electronic products via connectors. However, for some electronic products, including computers, that are mounted and used in offices and homes without the need to particularly reduce their weight, users would usually externally connect the access means to these electronic products. The access means externally connected to and disorderly located nearby the electronic products are visually unpleasant and subject to unexpected disconnection from the connectors due to undesired pull of connecting cables or electrical wires thereof. An expansion unit is developed for removably accommodating the externally provided access means therein. To use any of the external access means, simply connect the electronic product to the expansion unit via engaging means, such as pins, connectors, etc., correspondingly provided on the expansion unit and the electronic product.

However, users of the electronic product connected to the expansion unit still encounter the problem of EMI caused by the electronic product during its operation. That is, the electronic product generates electromagnetic waves during its operation to interfere with normal operation of other apparatus nearby the electronic product. It is therefore tried by the inventor to develop an expansion unit for electronic product that includes EMI prevention mechanism to overcome the problem of EMI existed in most electronic products.

SUMMARY OF THE INVENTION

A primary object of the present invention is to provide an EMI prevention mechanism for electronic products that includes electrically conducting contact pins and hooking members capable of effectively guiding electromagnetic waves generated by the electronic product during operation thereof to other places.

Another object of the present invention is to provide an EMI prevention mechanism that is also an expansion unit for an electronic product to stably connect thereto, and the mechanism has a simple structure to be manufactured at lower cost.

To achieve the above and other objects, the EMI prevention mechanism for electronic products according to the present invention mainly includes an expansion unit, on which an electronic product is loaded; at least one hooking member provided on the expansion unit for engaging with and accordingly locating the electronic product in place on the expansion unit; and at least one elastically depressible contact pin upwardly projected from the expansion unit for contacting with and depressing by the electronic product engaged with the expansion unit, such that the electronic product and the expansion unit are electro-magnetically connected to each other via the depressed contact pin. Wherein, at least one hooking member and at least one contact pin are made of an electrically conductive material.

Moreover, at least one of the hooking members and the expansion unit have conducting resin applied between them for the electronic product to electro-magnetically to connect to the expansion unit via at least one hooking member and the conducting resin.

At least one contact pin is extended through the expansion unit with an upper end upwardly projected from an upper surface of the expansion unit to contact with the electronic product, and a lower end downwardly projected from a lower surface of the expansion unit opposite to the upper surface to connect to a spring, and the spring enables the contact pin to elastically move upwards and downwards.

A metal plate having a middle recess is connected to the expansion unit with conducting resin applied between them. The spring is accommodated in a space formed between the metal plate and the expansion unit with upper and lower ends connected to the contact pin and the metal plate, respectively.

The metal plate includes a shaft located at a position to where the spring is connected. When the contact pin is elastically depressed by the electronic product to touch the shaft, the electronic product is electro-magnetically connected to the expansion unit.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
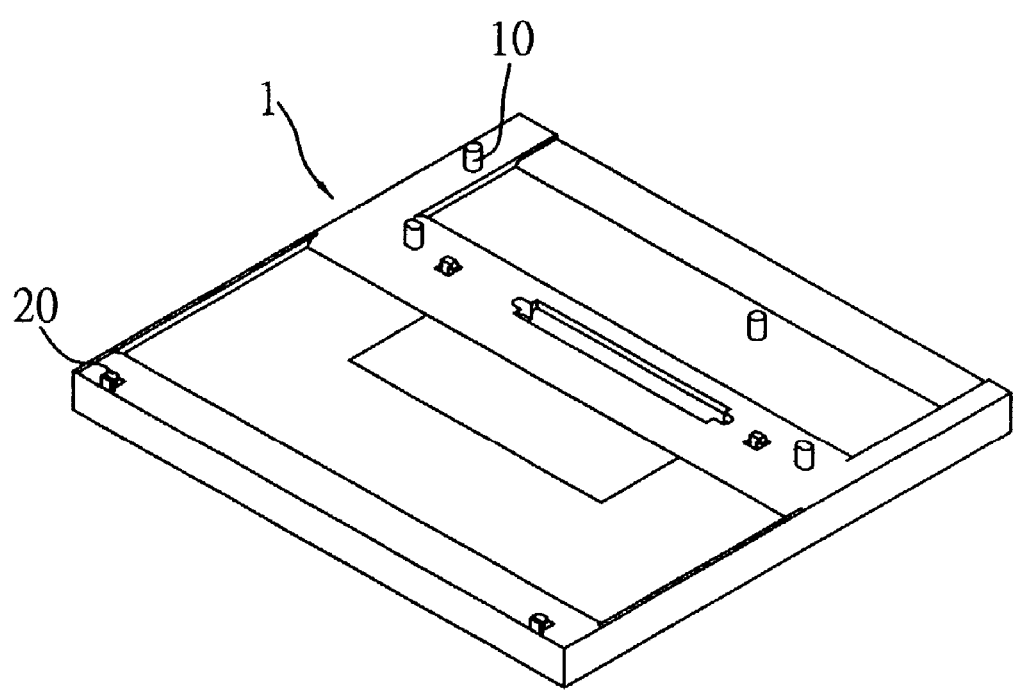
FIG. 1 is a perspective view of an EMI prevention mechanism for electronic products according to the present invention.

Please refer to FIG. 1 that is a perspective view of an electromagnetic-interference (EMI) prevention mechanism for electronic product according to the present invention. As shown, the EMI prevention mechanism includes an expansion unit 1 adapted for connecting to an electronic product, such as a notebook computer, a PDA, etc. The expansion unit 1 has an upper case, on which a plurality of contact pins 10 is provided at positions corresponding to the high-frequency electronic components of the electronic product connected thereto. There are also hooking members 20 provided on the expansion unit 1 for engaging with connection holes correspondingly provided on the electronic product connected thereto.

Figure 2:
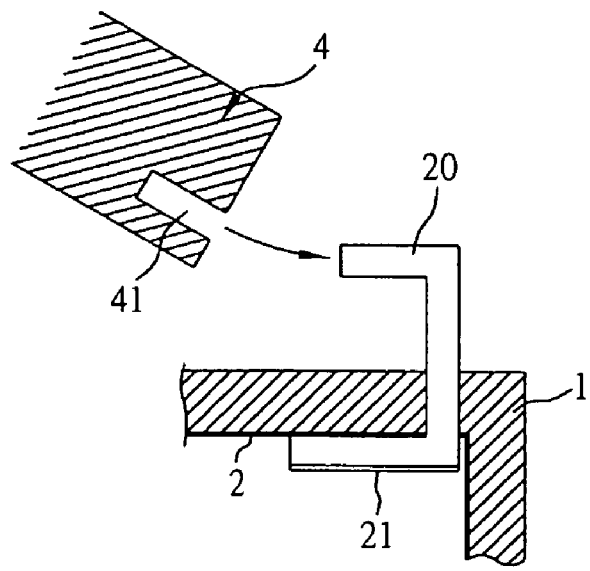
FIG. 2 is a partially enlarged sectional view of the EMI prevention mechanism for electronic products of FIG. 1 showing a hooking member thereof.

FIG. 2 is a partially enlarged sectional view of the hooking member 20. As shown, the hooking member 20 is made of an electrically conductive material end has a lower part embedded in the upper case of the expansion unit 1, and an upper part exposed from the upper case for engaging with the connection hole 41 correspondingly provided on the electronic product 4 connected to the expansion unit 1. The lower part of the hooking member 20 is fixed to the upper case of the expansion unit 1 with a fixing element 21, and a layer of conducting resin 2 is applied between the upper case and the lower part of the hooking member 20.

Figure 3:
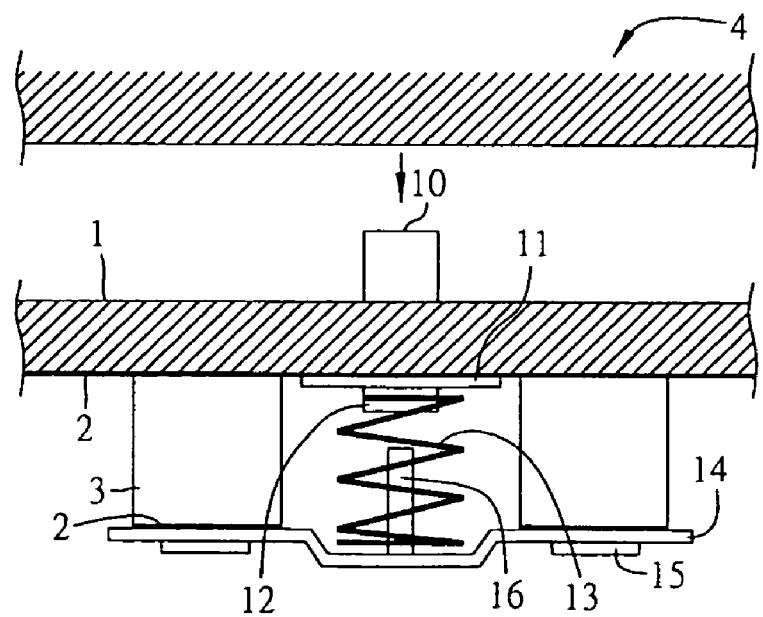
FIG. 3 is a partially enlarged sectional view of the EMI prevention mechanism for electronic products of FIG. 1 showing a contact pin thereof.

FIG. 3 is a partially enlarged sectional view of the contact pin 10. As shown, the contact pin 10 is downwardly extended through the upper case of the expansion unit 1 and can be elastically moved up or down relative to the upper case. When an electronic product is connected to the upper case of the expansion unit 1, it depresses the contact pink 10 at the same time; and when the electronic product 4 is separated from the expansion unit 1, the contact pins 10 elastically move upward again. A stopper 11 is connected to a lower part of each contact pin 10 below the upper case, so as to prevent the contact pin 10 from completely separating from the upper case of the expansion unit 1 when the contact pin 10 is elastically moved upwards. The contact pin 10 is provided at the lower part below the stopper 11 with a spring-connecting portion 12, to which an upper end of a spring 13 is connected. Two screw seats 3 are provided below the upper case of the expansion unit 1 at two sides of each contact pin 10. A metal plate 14 having a middle recess is locked to the two screw seats 3 and screws 15 tightened into the screw seats 3. Conducting resin 2 is also applied between the screw seats 3 and the metal plate 14, and between the expansion unit 1 and the screw seats 3. A shaft 16 is upwardly projected from a center of the middle recess of the metal plate 14 to support and locate a lower part of the spring 13 in place, such that upper and lower ends of the spring 13 are pressed against the spring-connecting portion 12 of the contact pin 10 and the metal plate 14, respectively. When the contact pin 10 is depressed, the spring-connecting portion 12 is in contact with the shaft 16.

Figure 4:
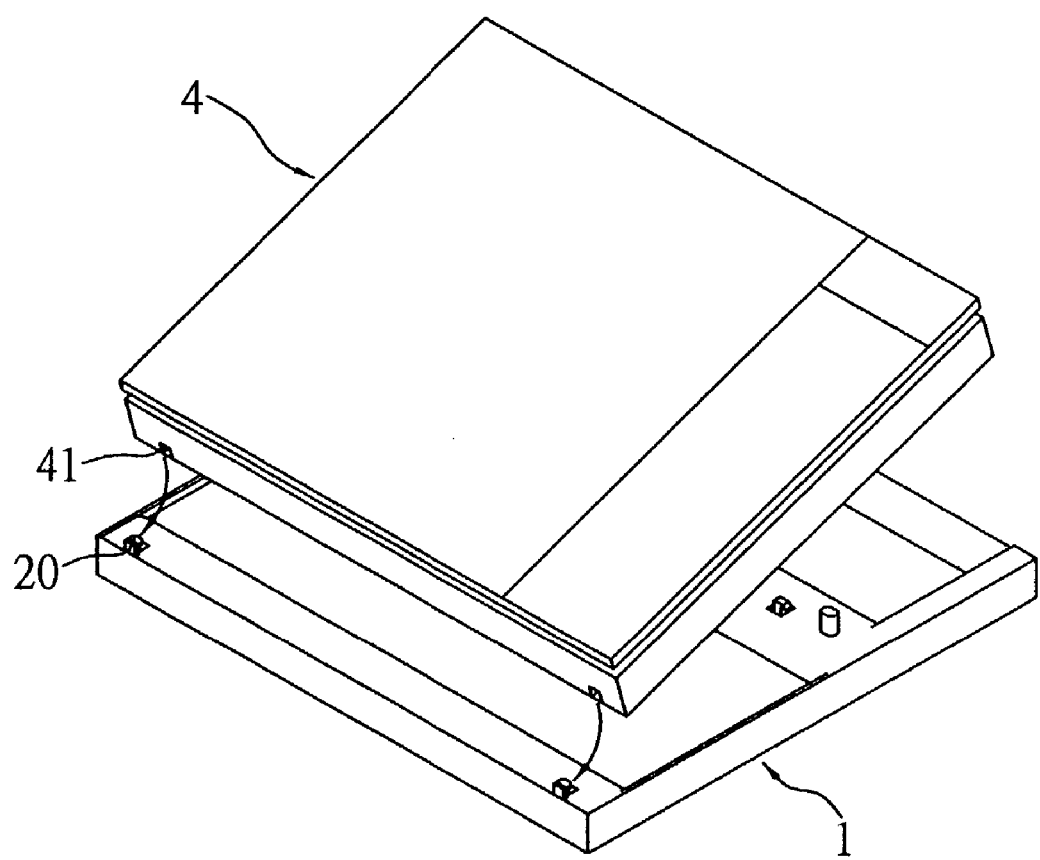
FIG. 4 shows an example of using the EMI prevention mechanism for electronic products according to the present invention.

Please refer to FIG. 4. To connect an electronic product, such as a notebook computer 4, to the expansion unit 1, first incline the notebook computer 4 to align connection holes 41 provided at a rear end thereof with the hooking members 20 of the expansion unit 1, allow the hooking members 20 to insert into the connection holes 41, and turn the notebook computer 4 to a horizontal position on the expansion unit 1. At this point, connecting members provided on the notebook computer 4 and the expansion unit 1 automatically engage with one another with the hooking members 20 contacting with a conducting resin (not shown) applied in the connection holes 41. After the notebook computer 4 is powered up, the conducting resin applied in the notebook computer 4 would guide electromagnetic waves generated by the notebook computer 4 to the hooking members 20 that are connected to the connection holes 41. The hooking members 20 fixed to the expansion unit 1 in turn guide the electromagnetic waves to the expansion unit 1 via the layer of conducting resin 2 applied between the hooking members 20 and the upper case of the expansion unit 1. Meanwhile, the contact pins 10 on the expansion unit 1 are in contact with fastening screws (not shown) at a lower case of the notebook computer 4 and are forced to move downward, bringing the lower spring-connecting portions 12 to press against the shafts 16. That is, electromagnetic waves generated by the operating notebook computer 4 are guided from the fastening screws at its lower case to the contact pins 10 on the expansion unit 1, the shafts 16 contacting with the contact pins 10, the metal plates 14 contacting with the shafts 16, and finally to the conducting resin 2 applied between the metal plates 14 and the screw seats 3.

With these arrangements, electromagnetic waves generated by electronic devices inside the notebook computer 4 during its operation can be effectively guided to the expansion unit 1 to avoid adverse influences on the operation of other nearby electronic apparatus.

It is understood the number and the configuration of the contact pins 10 and the hooking members 20 may be changed to meet the types of electronic products to be connected to the expansion unit 1 or to meet actual needs in use.

The following effects can be achieved with the EMI prevention mechanism of the present invention:

1. Since the EMI prevention mechanism of the present invention is made of electrically conducting components, it effectively guides the electromagnetic waves generated by the electronic devices inside the electronic product to the expansion unit 1 to prevent EMI.
2. All the components, such as the contact pins 10, the springs 13, the screws 15, etc., for forming the EMI prevention mechanism of the present invention are readily available in the market to simplify the construction of the mechanism and reduce the manufacturing cost thereof.
3. The engagement of the hooking members 20 on the expansion unit 1 with the connection holes 41 on the electronic product 4 not only enables the EMI prevention mechanism of the present invention to work effectively, but also ensures secure mounting of the electronic product on the expansion unit 1.

The present invention has been described with a preferred embodiment thereof and it is understood that many changes and modifications in the described embodiment can be carried out without departing from the scope and the spirit of the invention as defined by the appended claims.

What is claimed is:

1. An electromagnetic-interference (EMI) prevention mechanism for electronic product, comprising:
    a loading seat, on which an electronic product is loaded;
    at least one hooking member provided on said loading seat for engaging with and accordingly locating said electronic product in place on said loading seat; and
    at least one elastically depressible contact member upward projected from said loading seat for contacting with and depressing by said electronic product engaged with said loading seat,
    wherein said electronic product and said loading seat are electro-magnetically connected to each other via said depressed contact member and said hooking member, wherein said hooking member and said contact member are made of electrically conductive material the hooking member connected to a circuit path within the loading seat for guiding electromagnetic waves of the electronic product to the loading seat.

2. The EMI prevention mechanism for electronic product as claimed in claim 1, wherein said at least one hooking member and said loading seat have conducting resin applied between them for said electronic product to electro-magnetically connect to said loading seat via said at least one hooking member and said conducting resin.

3. The EMI prevention mechanism for electronic product as claimed in claim 1, wherein said electronic product is provided with at least one connection hole corresponding to said at least one hooking member provided on said loading seat for coupling with said at least one hooking member.

4. The EMI prevention mechanism for electronic product as claimed in claim 1, wherein said at least one contact member is extended through said loading seat with an upper end upwardly projected from an upper surface of said loading seat to contact with said electronic product, and a lower end downwardly projected from a lower surface of said loading seat opposite to said upper surface to connect to a spring, and said spring enabling said contact member to elastically move upwards and downwards.

5. The EMI prevention mechanism for electronic product as claimed in claim 4, wherein said loading seat has a metal plate with a middle recess connected thereto, such that a space is provided between said metal plate and said loading seat, and said spring being accommodated in said space with upper and lower ends connected to said contact member and said metal plate, respectively.

6. The EMI prevention mechanism for electronic product as claimed in claim 5, wherein said metal plate includes a shaft located at a position to where said spring is connected, and said contact member being elastically pressed against said shaft by said electronic product when said electronic product is connected to said loading seat, and contacts with the upper end of said contact member.

7. The EMI prevention mechanism for electronic product as claimed in claim 6, wherein said metal plate and said loading seat have a conducting resin applied between them, and said electronic product is electro-magnetically connected to said loading seat via said metal plate and the conducting resin between said metal plate and said loading seat when said contact member on said loading seat is elastically depressed by said electronic product to contact with said shaft on said metal plate.

8. The EMI prevention mechanism for electronic product as claimed in claim 4, wherein said spring is made of electrically conductive material.

9. The EMI prevention mechanism for electronic product as claimed in claim 5, wherein said spring and said metal plate, are made of electrically conductive material.

10. The EMI prevention mechanism for electronic product as claimed in claim 6, wherein said spring, said metal plate, and said shaft on said metal plate are made of electrically conductive material.

11. The EMI prevention mechanism for electronic product as claimed in claim 7, wherein said spring, said metal plate, and said shaft on said metal plate are made of electrically conductive material.

* * * * *